US008923769B2

(12) United States Patent
Bukovjan et al.

(10) Patent No.: US 8,923,769 B2
(45) Date of Patent: *Dec. 30, 2014

(54) SYSTEM FOR NEAR FIELD COMMUNICATION DATA CONVERSION WITH AN EVENT-FIELD

(71) Applicant: NXP B.V., Eindhoven (NL)

(72) Inventors: Peter Bukovjan, Gratkorn (AT); Francesco Gallo, Graz (AT)

(73) Assignee: NXP, B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/247,522

(22) Filed: Apr. 8, 2014

(65) Prior Publication Data
US 2014/0220890 A1    Aug. 7, 2014

Related U.S. Application Data

(63) Continuation of application No. 13/333,029, filed on Dec. 21, 2011, now Pat. No. 8,706,036.

(51) Int. Cl.
| | |
|---|---|
| *H04B 7/00* | (2006.01) |
| *H04B 5/00* | (2006.01) |
| *H04W 4/00* | (2009.01) |
| *G06Q 30/02* | (2012.01) |

(52) U.S. Cl.
CPC ............. *H04B 5/0031* (2013.01); *H04W 4/008* (2013.01); *G06Q 30/0242* (2013.01)
USPC ......................................... 455/41.2; 455/66.1

(58) Field of Classification Search
USPC ............. 455/41.1, 41.2, 41.3, 557, 466, 66.1; 340/10.1
See application file for complete search history.

(56) References Cited

U.S. PATENT DOCUMENTS

| | | | |
|---|---|---|---|
| 8,126,505 | B2 | 2/2012 | Tulloch |
| 8,346,210 | B2 | 1/2013 | Balsan et al. |
| 2002/0138347 | A1 | 9/2002 | Sakata |
| 2006/0136292 | A1 | 6/2006 | Bhati et al. |
| 2007/0073585 | A1 | 3/2007 | Apple et al. |
| 2007/0131759 | A1 | 6/2007 | Cox et al. |
| 2007/0132584 | A1 | 6/2007 | Malacarne et al. |
| 2007/0278291 | A1 | 12/2007 | Rans et al. |
| 2008/0126260 | A1 | 5/2008 | Cox et al. |
| 2009/0187507 | A1 | 7/2009 | Brown |
| 2010/0161410 | A1 | 6/2010 | Tulloch |

(Continued)

FOREIGN PATENT DOCUMENTS

CN    1363065 A1    8/2002

OTHER PUBLICATIONS

Gallo, F. "NFC Tags—A Technical Introduction, Applications and Products," Rev. 1.3, NXP, 21 pgs retrieved from the internet at: www.nfctags.com/.../White_paper_NFC%20Tags_NXP_Technical%20repo (Dec. 1, 2011).

(Continued)

*Primary Examiner* — Lewis West (57) ABSTRACT

In one embodiment, a communication apparatus is provided. The apparatus includes a near field communication circuit designed to update at least one event field, associated with a number of occurrences of at least one event, which converted from a first data coding format to a second data coding format and provided in an external communication message that is communicated automatically or in response to receiving an access command. Also included in the instant specification are communication systems, and methods of communicating.

20 Claims, 3 Drawing Sheets

(56) References Cited

U.S. PATENT DOCUMENTS

2011/0050756 A1 3/2011 Cassidy et al.
2011/0244964 A1 10/2011 Glynne-Jones et al.
2012/0254031 A1 10/2012 Walker et al.
2012/0310720 A1 12/2012 Balsan et al.
2012/0324242 A1 12/2012 Kirsch

OTHER PUBLICATIONS

Extended European Search Report for Patent Application No. EP 12196746.7 (Apr. 15, 2013).

"NFC Forum" NFC Forum, 5 pgs, retrieved from the Internet Jul. 15, 2013: http://www.nfcforum.org/home/ (2011).

Smart Poster Record Type Definition, Technical Specification, NFC Forum, SPR 1.1, Jul. 24, 2006.

Text Record Type Definition, Technical Specification, NFC Forum, RTD-Text 1.0, Jul. 24, 2006.

URI Record Type Definition, Technical Specification, NFC Forum, RTD-URI 1.0, Jul. 24, 2006.

NFC Forum Type Tags, White Paper V1.0, NXP Semiconductors, Mar. 31, 2009.

Office Action from counterpart application CN 201201556996.5 (Sep. 30, 2014).

SYSTEM FOR NEAR FIELD COMMUNICATION DATA CONVERSION WITH AN EVENT-FIELD

This application is a Continuation application of U.S. application Ser. No. 13/333,029 entitled "NEAR FIELD COMMUNICATION DATA CONVERSION WITH AN EVENT-FIELD" filed on Dec. 21, 2011.

Near field communication (NFC) is widely used in a variety of applications including, for example, smartphones, and similar devices including Radio Frequency Identification (RFID), to establish radio communication with each other by touching them together or bringing them into close proximity, for example within a short distance such as a few to several centimeters or inches. Applications include, among others, contactless transactions, data exchange, and simplified setup of more complex communications such as Wi-Fi. Various other types of communication applications include those between an NFC device and an NFC chip, called a "tag".

Some of the applications involving identification products such as smart cards and RFID tags are used in endeavors such as transport (e.g., ticketing, road tolling, baggage tagging), finance (e.g., debit and credit cards, electronic purse, merchant card), communications (e.g., SIM card for GSM phone), and tracking (e.g., access control, inventory management, asset tracking) International standard ISO/IEC 14443 is the industry standard for contactless smart cards, and the communication protocols associated therewith. ISO/IEC 14443-compliant products provide RF-communication technology for transmitting data between a card or tag and a reader device. For example, in electronic ticketing for public transport, travelers can wave a smart card over a reader at the turnstiles or entry point, benefiting from improved convenience and speed in the ticketing process. Such products can be important to individual mobility, and can support multiple applications such as road tolling, airline tickets, and access control.

Near Field Communication (NFC) is a short-range wireless technology (distances measured in centimeters) that is optimized for intuitive, easy, and secure communications between various devices without user configuration. In order to make two devices communicate, users bring them close together or even make them touch. The devices' NFC interfaces will automatically connect and configure themselves to form a peer-to-peer network. NFC can also bootstrap with other protocols, such as Bluetooth™ or Wireless Ethernet (WiFi), by exchanging configuration and session data.

NFC is compatible with contactless smart card platforms. This enables NFC devices to read information from these cards, making contactless smart cards a possible solution for bringing information and vouchers into the realm of NFC technology. NFC devices can also operate like a contactless card making them compatible with the huge installed infrastructure of ISO/IEC 14443-compliant systems.

Various example embodiments are directed to communication methods and apparatuses (including, for example, devices and communication systems) involving a near field communication (NFC) circuit that responds to interaction with another NFC device, such as in or part of a user's mobile device, by wirelessly communicating a message and updating at least one event field in the NFC communication circuit so as to indicate a number of occurrences and/or other event-indicative data relating to the wireless interaction with the near field communication circuit.

Aspects of the instant specification are directed towards communication apparatuses and methods involving communications between a near field communication circuit and another NFC (user) device. The near field communication circuit is designed to wirelessly communicate a message, and update at least one event field indicative of a number of occurrences of at least one event relating to wireless communication with the near field communication circuit. The near field communication circuit is also designed to convert the event field from a first data coding format into a second data coding format, and provide access to or (automatically) mirror the converted event field for processing as an external message, e.g., by automatically sending the converted relevant data to the near field communication circuit. In certain more specific embodiments, the event field represents or is indicative of a number of occurrences of at least one event relating to the wireless communication with a near field communication circuit. In other specific embodiments, the event field represents a unique identifier of the near field communication circuit for conveying this information to the other NFC (user) device as is useful for analytics processing and related event/venue information. In yet further specific embodiments, the event field represents the unique identifier as well as a count of the number of such occurrences.

Other aspects of the instant specification are directed towards a communication system that includes first and second near field communication circuits. The first near field communication circuit, which includes a transmission circuit and a memory circuit, is designed to wirelessly communicate a message, and update at least one event field that is indicative of a number of occurrences of at least one event relating to wireless communication with the first near field communication circuit. The first near field communication circuit is also configured to convert the event field from a first data coding format into a second data coding format, and mirror the converted event field into the message. The second near field communication circuit, included in a communication systems consistent with the instant specification, is designed to receive the wirelessly communicated message from the first near field communication circuit.

The above discussion is not intended to describe each embodiment or every implementation. The figures and following description also exemplify various embodiments.

Various example embodiments may be more completely understood in consideration of the following detailed description in connection with the accompanying drawings, in which.

While the specification is amenable to various modifications and alternative forms, examples thereof have been shown by way of example in the drawings and will be described in detail. It should be understood, however, that the intention is not to limit the specification to the particular embodiments shown and/or described. On the contrary, the intention is to cover all modifications, equivalents, and alternatives falling within the spirit and scope of the specification.

The present invention is believed to be applicable to communication methods, devices and systems involving a near field communication (NFC) circuit that wirelessly communicates a message and updates at least one event field that is indicative of a number of occurrences and/or data relating to at least one event relating to wireless communication with the near field communication circuit. While the present invention is not necessarily limited in this context, various aspects of the invention may be appreciated through a discussion of related examples.

Consistent with the present specification, certain specific examples concern such NFC type interactions wherein a circuit or system gathers information in an event field from and in response to one or more user devices, and updates data in an NFC circuit for identifying and/or tracking a number of occurrences relating to the communication between the NFC circuit and the user device(s). In more specific embodiments, these NFC-based interactions are referred to as "Smart Poster" approaches, and they involve automated actions in response to a user-coupled communication as caused by the user (of the user device) contacting or communicatively coupling signal (e.g., inductively, capacitively or acoustically) between an NFC device such as a mobile phone, tablet, personal digital assistant device or other similarly-portable electronic device and an NFC tag. The NFC tag can be integrated into a poster with the NFC (user) device being configured to read out the application data stored into the NFC tag.

In yet other specific embodiments, this (so-called) "Smart Poster" approach can involve automated actions in response to a user-coupled communication that occurs irrespective of the user intending to cause a signal to be communicatively coupled from the NFC device (e.g. mobile phone, tablet, personal digital assistant device or other similarly-portable electronic device). Such embodiments are useful, e.g., where the NFC tag integrated into a poster is used for user-specific marketing and advertisements as applicable for analytics based on the frequency and timing of user-devices being within the proximity of the NFC tag (for Smart Poster ads directed specifically to such user devices).

In certain additional specific embodiments, the event field represents or is indicative of a number of occurrences of at least one event relating to the wireless communication with a near field communication circuit. In other specific embodiments, the event field represents a unique identifier of the near field communication circuit for conveying this information to the other NFC (user) device as is useful for analytics processing and related event/venue information. In yet further specific embodiments, the event field represents the unique identifier as well as a count of the number of such occurrences.

Also, the application data of the NFC tag can contain information such as the web-page address of the concert advertised by the poster. In this case, the NFC (user) device may open a browser window and connect to the Internet to retrieve the web-page.

Yet other aspects of the instant specification are directed to identifying which smart poster is read by an end user with an NFC device. In instances, where an NFC tag with a Smart Poster is located in a specific location, it is useful to link the Unique Identifier (UID) of the NFC Tag with the Smart Poster. This can be useful to identify which Smart Poster has been read by the end-user with the NFC device. When the user connects to the Internet, the NFC device can send the UID to a back-end system so the back-end system knows which Smart Poster has been read. Moreover, not only is it advantageous to identify the specific Smart Poster that has been read, it is useful to identify how many times a Smart Poster is read. Such indications can be very useful from a marketing perspective, such as evaluating the Smart Poster placement, to understand the effectiveness of an advertisement.

The NFC wireless interaction between the NFC tag and the NFC (user) device can be effected with the data retrieval occurring automatically and, with or without a user-prompting display of information that is relevant to the user or the user's locale. Consistent herewith, the NFC wireless interaction occurs either with or without involvement of the user or event-indicative data being displayed for the user.

More general aspects of the instant specification are directed towards apparatuses, systems, and methods useful in near field wireless communication. Example embodiments of the instant specification are directed towards a communication apparatus. Such a communication apparatus includes a near field communication circuit, which includes a transmission circuit and a memory circuit. Near field communication circuits, consistent with the instant specification, are designed to update at least one event field indicative of a number of occurrences of at least one event relating to wireless communication with the near field communication circuit. In certain embodiments, the message communicated by the near field communication circuit includes a web-address. The event field can be, for example, a marker indicative of the number of occurrences the near field communication circuit is accessed, or a near field communication circuit identifier specific to the near field communication circuit.

Near field communication circuits are also configured and arranged to convert the event field from a first data coding format into a second data coding format (e.g., a hexadecimal coding format to a coding format consistent with the American Standard Code for Information Interchange (ASCII)), and provide at least one event field in the second data coding format for an external communication message that is communicated from the near field communication circuit automatically or in response to receiving an access command.

In certain embodiments of the apparatuses, consistent with the instant specification, the event (relating to wireless communication with a near field communication circuit) includes activation of the near field communication circuit. The event can also include successful selection of a near field communication circuit application in other embodiments. Additionally, the event relating to wireless communication with a near field communication circuit can include successful selection of a near field communication circuit application. Near field communications circuits, consistent with the instant specification, can include multiple events, and the examples provided are non-exhaustive.

A near field communication circuit, in certain embodiments, can additionally be designed to cease updating the event field. In certain embodiments of the instant specification, near field communication circuits can be located on a Smart Poster.

Aspects of the instant specification are additionally directed towards a communication system. Communication systems, consistent with the instant specification, include first and second near field communication circuits. The first near field communication circuit (which includes a transmission circuit and a memory circuit) is designed to update at least one event field that is indicative of a number of occurrences of at least one event relating to wireless communication with the first near field communication circuit. The first near field communication circuit is additionally designed to convert the event field from a first data coding format into a second data coding format, and provide at least one event field in the second data coding format for an external communication message that is communicated from the near field communication circuit automatically or in response to receiving an access command. The second near field communication circuit, included in systems consistent with the instant specification, is designed to receive the wirelessly communicated message from the first near field communication circuit.

In certain example embodiments, the event field is a marker indicative of the number of occurrences the first near field communication circuit is accessed, in other embodiments, the event field is a near field communication circuit identifier specific to the first near field communication circuit. Additionally, as systems in the instant specification can update at least one event field, certain embodiments can update both of the above described event fields. In certain specific embodiments, the number of occurrences of the event is one, and the at least one event field is a near field communication circuit identifier specific to the near field communication circuit.

Certain example embodiments of the instant specification can additionally include a collector arrangement that is designed to extract the at least one event field. A collector arrangement can, in certain more specific embodiments, additionally be designed to extract the event field from the second near field communication circuit after establishing an Internet connection. In other specific embodiments, the collector arrangement can be further designed to extract the event field from the first near field communication circuit. The message, communicated in the communication system consistent with the instant specification, can include a web-address, and the second near field communication circuit can be included with a mobile phone. Additionally, in example embodiments, the event includes successful selection of a first near field communication circuit application by the second near field communication circuit.

The instant specification is also directed towards methods, which include, updating at least one event field that is indicative of a number of occurrences of at least one event relating to wireless communication with a near field communication circuit. The method additionally includes converting the at least one event field from a first data coding format into a second data coding format, and providing at least one event field in the second data coding format for an external communication message that is communicated from the near field communication circuit automatically or in response to receiving an access command. Specific example embodiments of such a method can further include a step of wirelessly communicating the message a second near field communication circuit. Additionally, a method can include another step of resetting the at least one event field.

Figure 1:
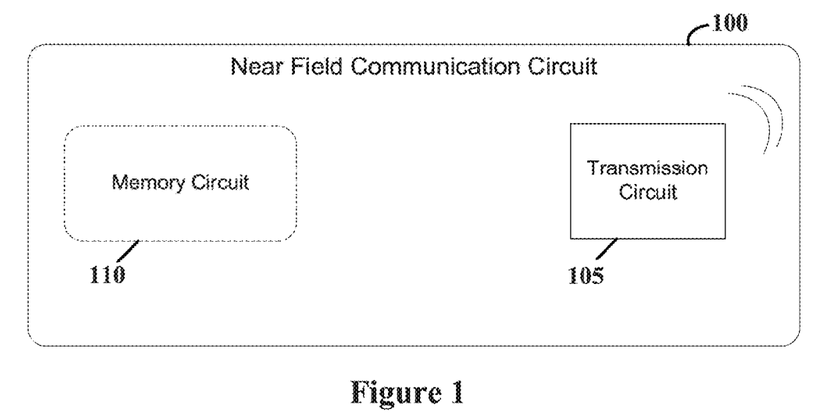
FIG. 1 shows an example embodiment of a communication apparatus, consistent with the instant specification.

Turning now to the figures, FIG. 1 shows an example communication apparatus consistent with the instant specification. The communication apparatus includes a near field communication circuit 100, which itself includes a transmission circuit 105 and a memory circuit 110. The near field communication circuit 100 is designed to update at least one event field. The event field is indicative of a number of occurrences of at least one event relating to wireless communication with the near field communication circuit 100. The event can include activation of the near field communication circuit 100, or successful selection of a near field communication circuit application or reception of dedicated command from the second near field communication circuit. The near field communication circuit 100 is also designed to convert the event field from a first data coding format into a second data coding format, and provide at least one event field in the second data coding format for an external communication message that is communicated from the near field communication circuit automatically or in response to receiving an access command. The first data coding format can be, for example, hexadecimal, and the near field communication circuit 100 can convert the hexadecimal coding to a coding format is consistent with the American Standard Code for Information Interchange (ASCII).

Certain embodiments of a communication apparatus, as shown in FIG. 1, are further characterized in that the event field is a marker indicative of the number of occurrences the near field communication circuit 100 is accessed. In other embodiments, apparatuses are further defined such that the event field is a near field communication circuit identifier specific to the near field communication circuit 100. In certain specific embodiments of the communication apparatus, the near field communication circuit 100 can be further designed to cease updating the event field. The near field communication circuit 100 can be located on a Smart Poster.

Figure 2:
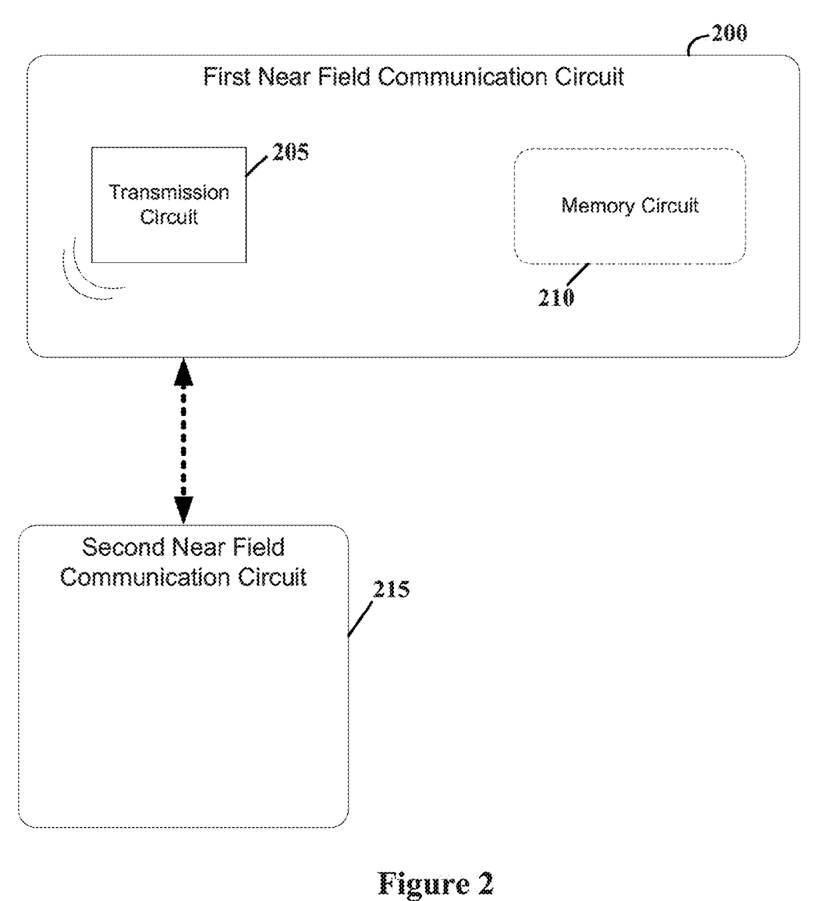
FIG. 2 shows a communication system, consistent with example embodiments of the instant specification.

Turning now to FIG. 2, aspects of the instant specification are also directed towards a communication system. A communication system, consistent with the instant specification, includes a first near field communication circuit 200 and a second near field communication circuit 215. The first near field communication 200 includes a transmission circuit 205 and a memory circuit 210. The first near field communication 200 is designed to update at least one event field that is indicative of a number of occurrences of at least one event relating to wireless communication with the first near field communication circuit 200. Additionally, the first near field communication 200 is configured to convert the event field from a first data coding format into a second data coding format, and provide at least one event field in the second data coding format for an external communication message that is communicated from the near field communication circuit automatically or in response to receiving an access command. The second near field communication circuit 215, included in communication systems described herein, is designed to receive the wirelessly communicated message from the first near field communication circuit 200.

The event field utilized in a communication system, consistent with the specification, can be a marker indicative of the number of occurrences the first near field communication circuit is accessed. Alternatively (or in addition to), the event field can be a near field communication circuit identifier specific to the first near field communication circuit 200. The message, communicated in communication systems, can include a web-address, and the second near field communication circuit 215 can be included with a mobile phone. As an example, the event relating to wireless communication in the communication system can be a successful selection of a first near field communication circuit application by the second near field communication circuit.

Figure 3A:
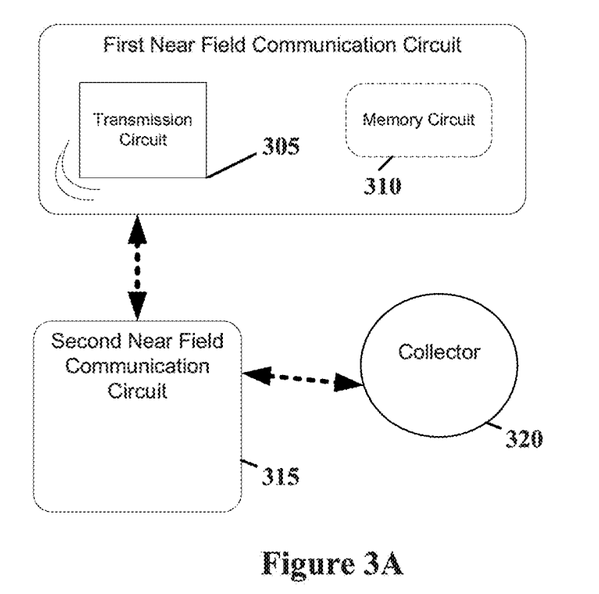
FIG. 3A shows an example embodiment of a communication system, consistent with various aspects of the instant specification.
Figure 3B:
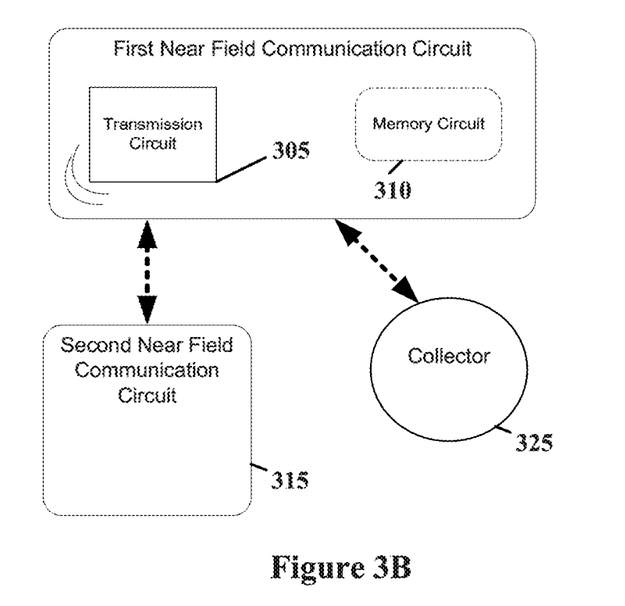
FIG. 3B shows another example embodiment of a communication system, consistent with the instant specification

Turning now to FIGS. 3A and 3B, which show a communication system consistent with the instant specification. In certain example embodiments, a communication system, consistent with the system described above with reference to FIG. 2, can further include a collector arrangement 320/325. The collector arrangement 320/325 is designed to extract the event field. FIG. 3A shows an example embodiment of the communication system which includes a collector arrangement 320. The collector arrangement 320 is designed to extract the event field from the second near field communication circuit after establishing an Internet connection. Turning now to FIG. 3B, which shows another example embodiment of the communication system which includes a collector arrangement 325. The collector arrangement 325, shown in FIG. 3B, is designed to extract the event field from the first near field communication circuit.

The communication apparatuses, systems, and methods of the instant disclosure can be further illustrated by the example of a Smart Poster with an accompanying NFC tag. Smart Posters used in advertising can contain an NFC Tag (e.g., a near field communication circuit). Each of the NFC tags, consistent with the instant specification, have a unique identifier (UID) and a counter. The NFC tag will contain a URL (e.g., an advertisement for a concert or merchant) that is to be communicated to an NFC device (e.g., an NFC enabled mobile phone) when the NFC device is communicatively coupled with the NFC tag. The NFC tag, consistent with the instant specification, will merge the UID and/or the counter with the URL (in ASCII coding) into a message that is to be sent from the NFC tag to the NFC device. Reading the Smart Poster, including the NFC tag, with an NFC device will send the URL (with the UID and counter) to a back-end system. The UID is analyzed at the back-end system. From this information, the back-end system can determine the location of the Smart Poster, and determine from the counter the number of times the post has been effectively read. Additionally, the back-end system can determine if the NFC device user is immediately connecting to the Internet (accessing the URL associated with the NFC tag).

The back-end system, consistent with the instant disclosure, can build several analytics useful for marketing and advertising based on the NFC tag URL message. For example, the back-end system can determine the number of times a Smart Poster was read, the number of times the poster was read within a certain period. Further, the back-end system can determine the correlation between reading the poster, and purchase of the item associated with the Smart Poster's advertisement (e.g., a ticket for the movie). As a result of the analytics of the back-end system, additional marketing and advertisement statistics can be determined, such as identifying ideal Smart Poster placement (as well as poor Smart Poster placement) based on the number of reads of a Smart Poster. Moreover, the back-end system can determine the effectiveness of one Smart Poster in comparison to another Smart Poster based on the number of those Smart Poster reads placed in the same location.

Certain aspects of the instant specification operate to link a Smart Poster's URL, stored within the NFC tag's NDEF (NFC Data Exchange Format) message, with a specific NFC tag's unique identifier (UID). Certain other aspects of the instant specification utilize an NFC counter as a part of the NFC tag to determine how often the Smart Poster was read. The NFC counter is not limited only to the Smart Poster or Voucher use case and to an NFC tag.

In order to utilize the unique identifier (UID) of an NFC tag, the UID is converted to a different data coding format. The following describes conversion to a data format consistent with the American Standard Code for Information Interchange (ASCII), however, other data formats can be used.

Certain usages of a UID ASCII representation is expected to be within, although not limited to, the Internet web-address (URL) contained in the Smart Poster—NFC tag, which will be opened by the potential customers reading the smart poster. In the instant example, the NFC tag UID is part of the URL, and can be then processed by the backend system at poster owner side. Together with opening the web page and reading the content by the potential customer, the information regarding the UID is sent back to the back-end system, where statistics can be built.

The URL can be stored in the NDEF message within the NFC tag non-volatile memory (EEPROM). In order to simplify the processing of the complete URL by the backend system, not only the fixed portion of the URL but the complete URL shall be coded in the ASCII format. In that instance, the URL from the NDEF message could be simply read from the Electrically Erasable Programmable Read-Only Memory (EEPROM) and sent to the reader by the NFC device (e.g., mobile phone) providing an Internet connection.

An example of such a conversion from a UID's hexadecimal value to an ASCII value is:

| HEX | | | | | | |
|---|---|---|---|---|---|---|
| 04 | 11 | 22 | 33 | 44 | 55 | 66 |
| ASCII | | | | | | |
| 30 34 | 31 31 | 32 32 | 33 33 | 34 34 | 35 35 | 36 36 |

To support on-line reception of an NFC counter value, an ASCII representation of the counter can be placed in specified address within the user memory, such as where an NFC tag NDEF message containing URL address is located. Consistent with the instant specification, an NFC counter can count using hexadecimal coding. However, additional coding formats (e.g., Gray Code: change of only 1 bit every counter step) can also be used. The coding format used can be based on an NFC counter size, and the organization of the blocks in an NFC tag non-volatile memory (EEPROM). Counting and storing of an NFC counter value within an NFC tag EEPROM is independent of whether or not there is an immediate Internet connection to the URL after the counted event.

In certain embodiments, a Smart Poster NFC counter value is part of the URL, and can be then processed by the backend system at Smart Poster owner side. Together with opening the web page and reading the content by the potential customer, the information about the NFC counter value is sent back to the back-end system. In certain aspects of the instant specification, the URL is stored in the NDEF message within the NFC tag EEPROM.

The example of such a conversion for 4 byte NFC counter value from its hexadecimal value to its ASCII value is:

| HEX | | | |
|---|---|---|---|
| 00 | 22 | AB | FF |
| ASCII | | | |
| 30 30 | 32 32 | 41 42 | 46 46 |

UID and NFC counter value ASCII representation is for each byte converting each nibble to ASCII according to the following table:

| Dec | Hex | Symbol |
|---|---|---|
| 48 | 30 | 0 |
| 49 | 31 | 1 |
| 50 | 32 | 2 |
| 51 | 33 | 3 |
| 52 | 34 | 4 |
| 53 | 35 | 5 |
| 54 | 36 | 6 |
| 55 | 37 | 7 |
| 56 | 38 | 8 |
| 57 | 39 | 9 |
| 65 | 41 | A |
| 66 | 42 | B |
| 67 | 43 | C |
| 68 | 44 | D |
| 69 | 45 | E |
| 70 | 46 | F |

The specification is not limited to the example of converting hexadecimal to ASCII, and it is not limited to only to use with a Smart Poster. The above discussion is provided as an example. In general UID and NFC counter inclusion into an NFC tag can be applied to any use case that involves NFC tag and contact/contactless cards.

An NFC counter, consistent with the instant specification, can automatically count one or more of a number of events associated with accessing an NFC tag, which includes such an NFC counter. For example, an NFC counter can automatically count activation (or accessing) of an NFC tag. Moreover, an NFC counter can track a single or a set of failed or successful commands (e.g., successful reading of any memory block) sent from an NFC device attempting to access an associated NFC tag. An NFC counter can additionally track/count the number of successful or unsuccessful selections of an NDEF Tag Application associated with an NFC tag. An NFC counter, in accordance with the instant specification, can additionally count: successful selection of a Capability Container (CC) file; successful read of a CC file; and successful read of a complete CC file. Aspects of the instant specification allow an NFC counter to track successful selection of a mandatory NDEF file. An NFC counter, consistent with the instant specification, can also count successful reading and/or writing of a complete NDEF message, whether the message is mandatory or not mandatory. Also, NFC counters of the instant specification can count successful reading/writing of any Elementary file (e.g., CC file, NDEF file(s) or Proprietary file(s)). The events described are not limiting and provided only as an example.

An owner of a Smart Poster owner can retrieve an NFC counter value in number of ways. For example, a Smart Poster owner may access an NFC counter value on-line, when an Internet connection is established, by at least some of owners of an NFC device. The ASCII mirror of the counter value appended to the URL address is sent back to the Smart Poster owner. Alternatively, a Smart Poster owner may access an NFC counter value off-line by approaching the Smart Poster containing the NFC tag, and reading the counter value with an NFC device or other reader.

NFC counters, consistent with the instant specification, can take a specific action once a specific value is reached on the counter. For example, an NFC counter can stop increasing the count, or stop allowing read/write access to an associated NFC tag. Further, upon reaching a certain value, an NFC counter can clear the counter to its initial value, clear the counter value entirely (write in the counter record the value, therefore clearing all bits), set the NFC counter value to any pre-determined value, set the NFC counter value to its maximum pre-defined value; disable the NFC counter, or restore an associated NFC tag to a pre-defined state. Additionally, upon reaching a certain value, an NFC counter can set the NFC counter value to write in the counter record value to an entire bit set. Moreover, upon reaching a certain value, an NFC counter can change the NFC tag state from Read/Write to Read-Only. Until NFC counter reaches its "final" value it cannot be reset or current value cannot be decremented in the case of increment counter or vice versa (one directional counter).

Figure 4:
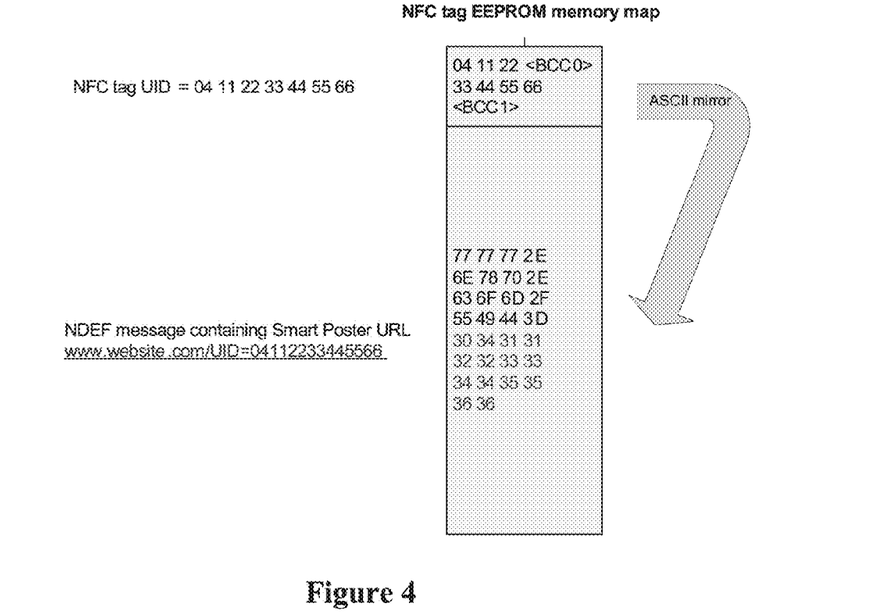
FIG. 4 shows an example ASCII mirroring of a near field communication circuit unique identifier (UID) into a Smart Poster URL, consistent with various aspects of the instant specification.

To facilitate NFC tag initialization at customer or system integrator sites by avoiding of die individual data to be written (data patching) in the EEPROM, the UID is not converted to its ASCII representation specified above within the NFC tag initialization procedure, and then patched to the fixed initialization pattern writing NDEF message, but it is mirrored by NFC tag itself to the correct location (specified by the customer) within the NDEF message. The mirroring of a NFC tag's UID is shown in FIG. 4.

Figure 5:
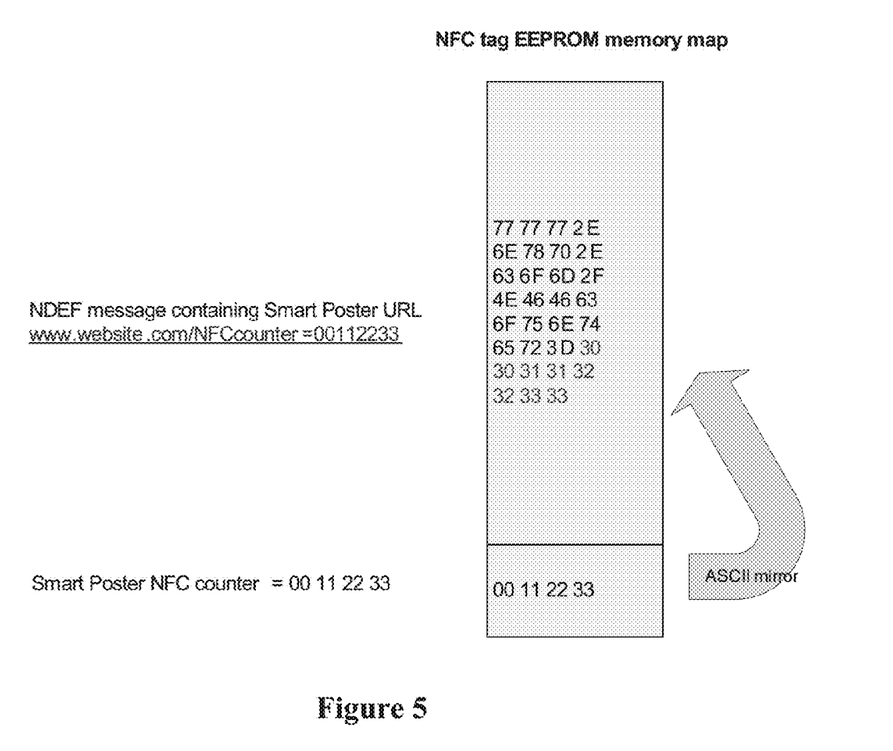
FIG. 5 shows an example ASCII mirroring of a near field communication counter into a Smart Poster URL, consistent with the instant specification.

Conversion of an NFC counter value is also accomplished by mirroring. The NFC value is mirrored from an NFC tag memory location (where the NFC counter is located) into a correct location (specified by the customer) within an NDEF message stored in the user memory. This process is shown in FIG. 5.

Based upon the above discussion and illustrations, those skilled in the art will readily recognize that various modifications and changes may be made without strictly following the exemplary embodiments and applications illustrated and described herein. Furthermore, various features of the different embodiments may be implemented in various combinations. Such modifications do not depart from the true spirit and scope of the present specification, including those set forth in the following claims.

What is claimed is:

1. A method comprising processing an external communication message for transmission by a near field communication circuit by
updating at least one event field that is indicative of a number of occurrences of at least one event relating to wireless communication by the near field communication circuit;
converting the at least one event field from a first data coding format into a second data coding format; and
transmitting, via the near field communication circuit, the external communication message in the second data coding format automatically or in response to receiving an access command.

2. The method of claim 1, further including receiving, via a second near field communication circuit, the external communication message.

3. The method of claim 1, further including receiving, via a second near field communication circuit, the external communication message and extracting the event field from the second near field communication circuit in response to the second near field communication circuit establishing an Internet connection.

4. The method of claim 1, wherein the least one event field is a marker indicative of a the number of occurrences the near field communication is accessed, and further including receiving, via a second near field communication circuit, the external communication message and extracting the event field from the second near field communication circuit in response to the second near field communication circuit establishing an Internet connection in order to determine the number of occurrences of the near field communication being accessed.

5. The method of claim 1, wherein the event field is least one of: a marker indicative of a the number of occurrences the near field communication is accessed, a near field communication circuit identifier specific to the near field communication circuit, an indication of the number of activations of the near field communication circuit, and an indication of successful selection of a near field communication circuit application; and further including receiving, via a second near field communication circuit, the external communication message, and extracting the event field from the second near field communication circuit in response to the second near field communication circuit establishing an Internet connection to assess the event field.

6. The method of claim 1, wherein the external communication message includes a web-address having an identification of the near field communication circuit that conveys data indicating that the near field communication circuit has been accessed.

7. A method comprising:
receiving, via a first near field communication circuit, an external communication message; and
processing the external communication message to access at least one event field that is indicative of a number of occurrences of the at least one event relating to wireless communication by a second near field communication circuit, the at least one event field having been converted from a first data coding format into a second data coding format.

8. The method of claim 7, further including transmitting, via the second recited near field communication circuit, the external communication message in the second data coding format automatically or in response to receiving an access command.

9. The method of claim 7, further including extracting the event field from the near field communication circuit in response to the near field communication circuit establishing an Internet connection.

10. The method of claim 7, wherein the at least one event field is a near field communication circuit identifier specific to the first near field communication circuit.

11. The method of claim 7, further including transmitting, via the second recited near field communication circuit, the external communication message in the second data coding format automatically or in response to receiving an access command, and extracting the at least one event field from one of the near field communication circuits.

12. A communication system comprising:
a first near field communication circuit configured and arranged to
update at least one event field that is indicative of the number of occurrences of at least one event relating to wireless communication with the first near field communication circuit, and
convert the at least one event field from a first data coding format into a second data coding format and provide the at least one event field in the second data coding format for an external communication message that is communicated from the near field communication circuit automatically or in response to receiving an access command; and
a second near field communication circuit configured and arranged to receive the external communication message from the first near field communication circuit.

13. The system of claim 12, wherein the at least one event field is a marker indicative of the number of occurrences the first near field communication circuit is accessed, and wherein the first near field communication circuit is configured and arranged to communicate the external communication message to the second near field communication circuit using a near field communication signal.

14. The system of claim 12, wherein the at least one event field is a near field communication circuit identifier specific to the first near field communication circuit.

15. The system of claim 12, further including a collector arrangement configured and arranged to extract the at least one event field.

16. The communication system of claim 15, wherein the collector arrangement is further configured and arranged to extract the at least one event field from the second near field communication circuit after establishing an Internet connection.

17. The communication system of claim 15, wherein the collector arrangement is further configured and arranged to extract the at least one event field from the first near field communication circuit.

18. The communication system of claim 12 wherein the message includes a web-address including an identification of the near field communication circuit, and the second near field communication circuit is included with a mobile phone, whereby accessing the web-address via the mobile phone conveys data indicating the identification of the first near field communication circuit and indicating that the first near field communication circuit has been accessed.

19. The communication system of claim 12, wherein the at least one event field includes receiving a dedicated command from the second near field communication circuit.

20. The communication system of claim 12, wherein the at least one event includes successful selection of a first near field communication circuit application by the second near field communication circuit.

* * * * *